United States Patent
Singh et al.

(10) Patent No.: US 9,319,957 B1
(45) Date of Patent: Apr. 19, 2016

(54) DYNAMIC SWAPPING OF UPLINK AND DOWNLINK BASE STATIONS

(71) Applicant: Sprint Spectrum L.P., Overland Park, KS (US)

(72) Inventors: Jasinder P. Singh, Olathe, KS (US); Brett Christian, Independence, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 248 days.

(21) Appl. No.: 13/955,731

(22) Filed: Jul. 31, 2013

(51) Int. Cl.
*H04W 36/00* (2009.01)
*H04W 36/30* (2009.01)

(52) U.S. Cl.
CPC .................................... *H04W 36/30* (2013.01)

(58) Field of Classification Search
CPC ...... H04W 72/10; H04W 88/08; H04L 47/10; H04L 47/11
USPC ........... 455/436, 435.1, 500, 509, 423, 462.1, 455/464, 91, 130, 522; 370/347, 315, 352, 370/395.4, 329, 335
See application file for complete search history.

(56) References Cited

U.S. PATENT DOCUMENTS

| | | | |
|---|---|---|---|
| 7,684,408 B2 * | 3/2010 | Wakabayashi | 370/395.4 |
| 7,974,240 B2 * | 7/2011 | Liu | H04B 7/15542 370/315 |
| RE43,385 E * | 5/2012 | Wakabayashi | H04W 28/14 370/395.4 |
| 8,385,936 B2 * | 2/2013 | Bai et al. | 455/452.2 |
| 9,054,841 B2 * | 6/2015 | Ouchi | H04L 5/0048 |
| 2003/0045307 A1 * | 3/2003 | Arviv et al. | 455/464 |
| 2004/0235510 A1 * | 11/2004 | Elicegui | H04W 52/40 455/522 |
| 2006/0189334 A1 * | 8/2006 | Wakabayashi | 455/500 |
| 2007/0037581 A1 * | 2/2007 | Morita | 455/453 |
| 2008/0013520 A1 * | 1/2008 | Liu | H04B 7/15542 370/347 |
| 2009/0143065 A1 * | 6/2009 | Mattila | 455/423 |
| 2010/0113060 A1 * | 5/2010 | Bai et al. | 455/453 |
| 2010/0317363 A1 * | 12/2010 | Bai et al. | 455/452.2 |
| 2012/0099458 A1 * | 4/2012 | Ezaki | H04W 72/0406 370/252 |
| 2012/0163320 A1 * | 6/2012 | Akimoto | H04L 5/0051 370/329 |
| 2012/0188884 A1 * | 7/2012 | Simonsson et al. | 370/252 |
| 2012/0238268 A1 * | 9/2012 | Radulescu et al. | 455/435.1 |
| 2012/0309394 A1 * | 12/2012 | Radulescu et al. | 455/436 |
| 2013/0010723 A1 * | 1/2013 | Ouchi | H04L 5/0048 370/329 |
| 2013/0010765 A1 * | 1/2013 | Wakabayashi | H04W 28/14 370/335 |
| 2013/0070625 A1 * | 3/2013 | Fujishima et al. | 370/252 |
| 2013/0100938 A1 * | 4/2013 | Kwon et al. | 370/336 |
| 2013/0272260 A1 * | 10/2013 | Bitran | H04W 16/14 370/329 |
| 2014/0098798 A1 * | 4/2014 | Khandekar et al. | 370/336 |
| 2014/0112269 A1 * | 4/2014 | Yu et al. | 370/329 |

* cited by examiner

*Primary Examiner* — Joseph Arevalo

(57) ABSTRACT

A method and system is disclosed for dynamic swapping of uplink and downlink base stations. A user equipment device (UE) may engage in a communication session with a downlink from a first base station (e.g., eNodeB) and an uplink to second, different base station. If a determination is made that more favorable operating conditions for transmitting session communications to the UE are available on a downlink air interface from the second base station than on the downlink air interface from the first base station, the uplink and downlink may be swapped, such that after swapping, the UE may have a downlink from second base station and an uplink to the first base station.

17 Claims, 6 Drawing Sheets

DYNAMIC SWAPPING OF UPLINK AND DOWNLINK BASE STATIONS

BACKGROUND

Unless otherwise indicated herein, the materials described in this section are not prior art to the claims and are not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure, such as a mobile switching center (MSC) and/or a packet data serving node (PDSN) for instance, that provides connectivity with one or more transport networks, such as the public switched telephone network (PSTN) and/or a packet-switched network such as the Internet for instance. With this arrangement, a UE within coverage of the network may engage in communication with a base station over an "air interface," and may thereby communicate via the base station with various remote network entities or with other UEs.

In addition to such components as antennas and transceivers that provide radio frequency (RF) access, base stations may include or be communicatively coupled with other components and/or devices for controlling and managing RF communications, and interconnecting with each other and with network transport and network core functionalities. Functioning collectively to provide wireless (i.e., RF) access to services and transport in the wireless communication system, these components and devices (e.g., base stations, MSCs, controlling entities, etc.) comprise what is typically referred as a Radio Access Network (RAN).

In an example arrangement, the network infrastructure may include one or more gateways or similar components that provide connectivity with a packet-switched network so as to support various communication services. For instance, the infrastructure may include gateways that support general packet-data communications, such as general web browsing, file transfer, and the like. Further, the infrastructure may include gateways that support real-time packet-based communications such as voice over Internet Protocol (VoIP) and streaming media for instance, by exchanging communications with one or more application servers that provide such services. And still further, the infrastructure may include gateways that support other types of communication services as well, possibly arranged to exchange communications with other types of application servers and systems.

When a UE powers on or moves into the coverage of a base station, the UE engages in a process of registering or "attaching" with the network, which triggers setup of various communication channels for the UE. For example, in a network operating according to the Long Term Evolution (LTE) protocol, a UE transmits an attach request message to the base station, which the base station forwards to a controller such as a mobility management entity (MME). In response, the controller then invokes a process to authenticate and authorize the UE and retrieves a service profile of the UE from a subscription database and stores them for later reference during service invocation to determine one or more services that the UE is authorized to use. Further, the controller engages in signaling with the base station and one or more gateways to define one or more bearer connections for the UE between the base station and the gateways. The base station may then assign a radio link layer connection for the UE. And to the extent the gateways support communication with particular servers or systems, the gateways may then further register with those servers or systems on behalf of the UE.

Once these connections are established, the UE may then be considered as engaging in a communication session, during which it may communicate bearer data (e.g., application layer communications such as web browsing and VoIP setup signaling and traffic) with various application servers or systems. In particular, as the base station serves the UE in the communication session, bearer data may pass from the UE over the radio link layer connection to the base station, through one or more bearer connections between the base station and one or more gateways, and from the one or more gateways onto the packet-switched network and perhaps to particular application servers or systems. Likewise, communications destined to the UE from various application servers or system may pass to the one or more gateways registered on behalf of the UE, then over one or more bearer connections from the one or more gateways to the serving base station, and over the radio link layer connection from the base station to the UE.

OVERVIEW

Communications from a base station (or other form of access node) to a UE are carried on a "downlink" of an air interface between the UE and base station, and communications from a UE to the base station are carried on an "uplink" of the air interface. The UE is initially assigned a downlink from a serving base station and an uplink to the serving base station as part of the attachment process mentioned above. As the UE possibly moves through different physical locations during a communication session, the UE may "hand over" from operating in one coverage area (e.g., cell or sector) to operating in another coverage area. In a usual case, this handover process is triggered by the UE monitoring the signal strength of various nearby available coverage areas, and the UE and/or base station (or other network access entity) determining when one or more threshold criteria are met. By convention, an UE is said to handover from a "source" cell or sector (or other coverage area) to a "target" cell or sector. As one result of handover, the UE may replace its uplink and downlink with its source cell or sector with an uplink and downlink with the target cell or sector.

It can also sometimes happen that a UE is assigned a downlink from a first base station and an uplink to different, second base station. For example, the UE may be located at comparable distances to each of two different base stations, and during initial attachment may be assigned a downlink from one and an uplink to the other. During the course of a communication session, the relative operating conditions for downlink transmissions from each to the two base stations may vary, such that it would be advantageous to swap which of the first and second base stations provide the downlink to the UE. For example, the UE may move closer to the second base station by an amount that results in an increase in signal power from the second base station sufficient to support a higher downlink data rate from the second base station than from the first. This could be the case even if the UE remains closer the first base station than to the second. For example, the downlink of the second base station could have a larger bandwidth than that of the first base station. By decreasing its distance to the second base station while remaining still closer to the first, the UE might be able to obtain better downlink service from the second base station than the first.

At the same time, swapping the downlink to the UE from the first to the second base station can also give rise to conditions that make a corresponding swapping of the uplinks to the two base stations desirable or advantageous. Accordingly, by monitoring operating conditions, including relative distances from the UE to the two base stations, as well as relative bandwidth and relative load of the two base stations, it is possible to determine when it would be desirable to swap downlinks and uplinks between two base stations and a UE.

Hence, in one respect, various embodiments of the present invention provide, in a wireless communication system including a first base station and a different, second base station, a method comprising: while serving a user equipment device (UE) in a communication session, transmitting session communications to the UE over a downlink air interface from the first base station and receiving session communications from the UE over an uplink air interface to the second base station; making a determination that more favorable operating conditions for transmitting session communications to the UE are available on a downlink air interface from the second base station than on the downlink air interface from the first base station; and in response to making the determination, swapping the downlink air interface from the first base station with the downlink air interface from the second base station, and swapping the uplink air interface to the second base station with an uplink air interface to the first base station for session communications from the UE.

In another respect, various embodiments of the present invention provide, a device configured for operation in a wireless communication system, wherein the wireless communication system includes a first base station and a different, second base station, the device comprising: one or more processors; memory; and machine-readable instructions stored in the memory, that upon execution by the one or more processors cause the device to carry out operations comprising: while a user equipment device (UE) is engaging in a communication session over a downlink air interface channel from the first base station to the UE and over an uplink air interface channel from the UE to the second base station, making a determination that more favorable operating conditions for transmitting session communications to the UE are available on a downlink air interface channel from the second base station to the UE than on the downlink air interface channel from the first base station to the UE, and in response to making the determination, causing swapping of the downlink air interface channel from the first base station with the downlink air interface channel from the second base station, and causing swapping of the uplink air interface channel to the second base station with an uplink air interface channel from the UE to the first base station.

In still another respect, various embodiments of the present invention provide, a non-transitory computer-readable medium having instructions stored thereon that, upon execution by one or more processors of a radio access network (RAN) device of a wireless communication network that includes a first base station and a different, second base station, cause the RAN device to carry out functions including: while a user equipment device (UE) is engaging in a communication session over a downlink air interface channel from the first base station to the UE and over an uplink air interface channel from the UE to the second base station, making a determination that more favorable operating conditions for transmitting session communications to the UE are available on a downlink air interface channel from the second base station to the UE than on the downlink air interface channel from the first base station to the UE, and in response to making the determination, causing swapping of the downlink air interface channel from the first base station with the downlink air interface channel from the second base station, and causing swapping of the uplink air interface channel to the second base station with an uplink air interface channel from the UE to the first base station.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Example embodiments presented herein will be described by way of example with reference to wireless communication systems. It will be appreciated that wireless communication systems can employ a range of technologies designed to operate according to a number of related standards and protocols, including, without limitation, LTE, LTE Advanced, IS-2000, IS-856, IMT-2000, WiMax, and WiFi, among others, in order to deliver both circuit-cellular and wireless packet-data services. Underlying access technologies include CDMA, time division multiple access (TDMA), and orthogonal frequency division multiple access (OFDMA), among others.

Wireless communications systems can generally be classified under the umbrella of one or another representative system architecture. One example is a "CDMA network," which, despite its label, can include both CDMA-based wireless access (e.g., as specified under IS-2000) and TDMA-based wireless access (e.g., as specified under IS-856), among other technologies. Other examples include "UMTS networks," which also can include CDMA-based wireless access (e.g., as specified under IMT-2000), and "LTE Advanced networks," which can include OFDMA-based wireless access, and are sometimes considered as next-generation variants of, and deployed within, UMTS networks.

While dynamic swapping of uplink and downlink base stations is described by way of example in the context of LTE, it will be appreciated that the methods and systems in which they may be carried are not limited to LTE. For example, the methods and systems could be adapted for application in CDMA networks and/or UMTS networks, among other possibilities.

Figure 1:
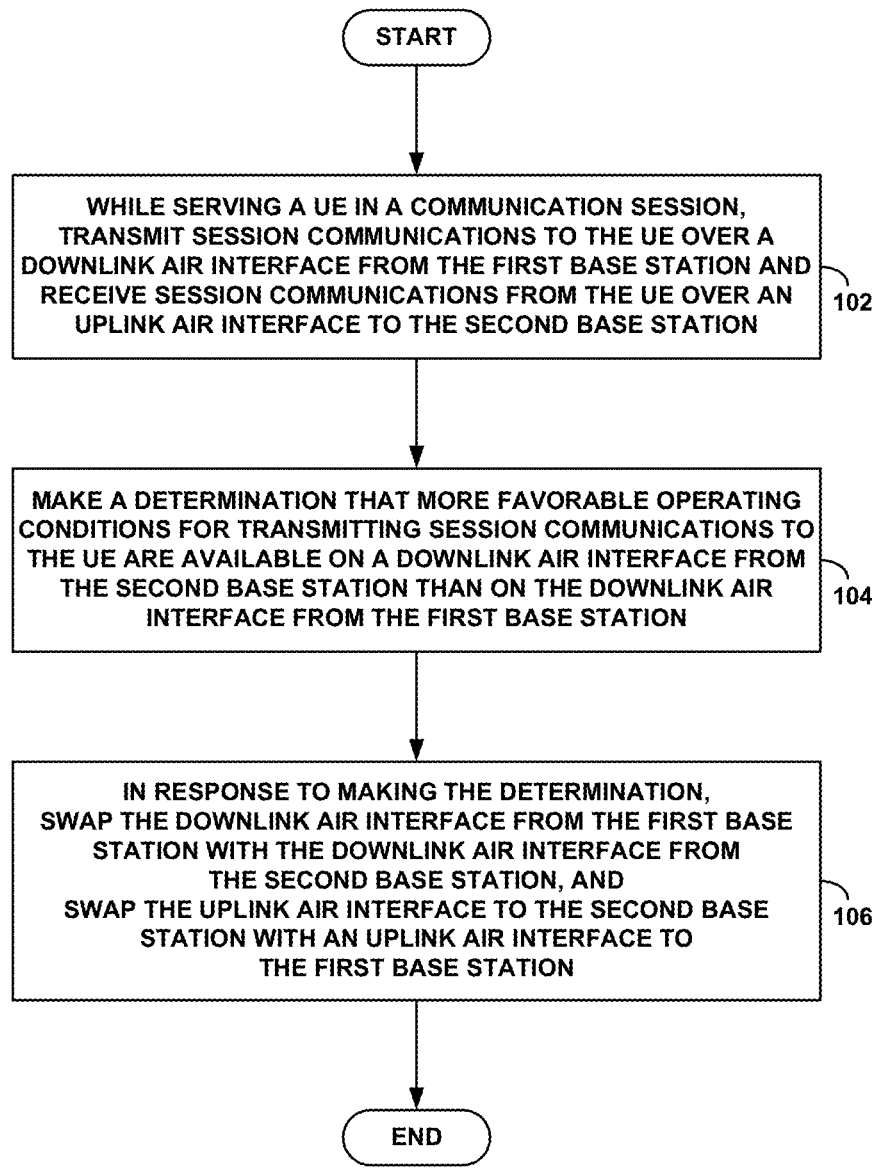
FIG. 1 is a flowchart depicting an example embodiment of a dynamic swapping of uplink and downlink base stations.

FIG. 1 is a flowchart depicting an example embodiment of a method of dynamic swapping of uplink and downlink base stations. By way of example, the steps of the flowchart could be implemented one or more RAN access nodes (e.g., base stations), configured to operate in a wireless communication system. In particular, a UE may be engaging in a communication session via a first and a second base station of the wireless communication system, and the method could be carried out collaboratively by both base stations, by one coordinating on behalf of both, or by a controlling entity of both base stations.

At step 102, while the UE is being served in a communication session, session communications are transmitted to the UE over a downlink air interface from the first base station, and are received from the UE over an uplink air interface to the second base station. By way of example, the first and second base stations could each be or include an "evolved NodeB" (eNodeB) configured to operate under LTE Advanced. Alternatively, and again by way of example, each could be a radio network controller (RNC), base station transceiver (BTS), base station controller (BSC), NodeB, or eNodeB. Further the first and second base stations need not be the exact same type of device.

At step 104, a determination is made that more favorable operating conditions for transmitting session communications to the UE are available on a downlink air interface from the second base station than on the downlink air interface from the first base station.

Finally, at step 106, the downlink air interface from the first base station is swapped with the downlink air interface from the second base station in response to the determination made a step 104. Also in response to making the determination, the uplink air interface to the second base station is swapped with an uplink air interface to the first base station for session communications from the UE.

In accordance with example embodiments, making the determination at step 104 could entail determining that the UE is located both greater than a first threshold distance from the first base station, and less than a second threshold distance from the second base station. For example, the first threshold distance could be 2.0 miles and the second threshold distance could be 2.5 miles. In this example case, the conditions for swapping do not require that the UE be closer to the second base station than to the first. Rather, only that the UE be closer than 2.5 miles from the second base station while being greater than 2.0 miles from the first. Other example thresholds could be used as well.

In further accordance with example embodiments, determining that the UE is located both greater than a first threshold distance from the first base station, and less than a second threshold distance from the second base station could involve determining that the distance between the UE and the first base station divided by the distance between the UE and the second base station is greater than a threshold ratio. Using a ratio could accommodate different relative distances. For example, using a threshold ratio of 0.8 would yield the swapping condition for a first distance of 2.0 miles and a second distance of 2.5 miles, as in the distance-threshold example above. But it would also yield the swapping condition for a first distance of 2.4 miles and a second distance of 3.0 miles. Other values of threshold ratio could be used as well. In addition, an equivalent inverse ratio condition could be used, whereby the determination of step 104 corresponds to a ratio of the second distance divided by the first distance being less than the inverse of the threshold ratio.

Also in accordance with example embodiments, making the determination at step 104 could entail determining that the downlink air interface from the second base station has more transmission capacity than the downlink air interface from the first base station. Transmission capacity could be measured as one or more of a fractional utilization of total transmission capacity, an available transmission bandwidth, a transmission rate, or a load.

Favorability of operating conditions for transmitting session communications on a downlink to the UE could also take account of how downlink transmission impact overall system performance, in addition to, or as an alternative to, the quality received by the UE and/or other UEs being served. Thus, in accordance with example embodiments, making the determination at step 104 could entail determining a performance metric, where the performance metric corresponds to at least one of: (i) a user quality metric indicative of a level of service provided to the UE, or (ii) a system quality metric indicative of an overall level of service provided by at least the first and second base stations of the wireless communication system to one or more UEs, including the UE.

In accordance with example embodiments, swapping the downlink air interface from the first base station with the downlink air interface from the second base station (at step 106) could entail executing a channel reassignment protocol. More particularly, a procedure specified by a channel reassignment protocol could be carried out in order to replace a downlink air interface channel from the first base station to the UE with a downlink air interface channel from the second base station to the UE, and thereafter to continue session communications to the UE over the downlink air interface channel from the second base station. Similarly, swapping the uplink air interface to the second base station with an uplink air interface to the first base station could entail executing the channel reassignment protocol. Again, a procedure specified by the channel reassignment protocol could be carried out in order to replace an uplink air interface channel from the UE to second base station with an uplink air interface channel from the UE to first base station, and thereafter to continue session communications from the UE over the uplink air interface channel to the first base station.

In accordance with example embodiments in which the wireless communication system is configured to operate at least according to Long Term Evolution (LTE), the channel reassignment protocol could include specification of procedures for handover. More specifically, executing the channel reassignment protocol with the UE to replace the downlink air interface channel from the first base station to the UE with the downlink air interface channel from the second base station to the UE could correspond to executing a handover of the UE from the first base station to the second base station for downlink communications. Similarly, wherein executing the channel reassignment protocol with the UE to replace the uplink air interface channel from the UE to second base station with the uplink air interface channel from the UE to first base station could correspond to executing a handover of the UE from the second base station to the first base station for uplink communications.

It will be appreciated that the example embodiment illustrated in FIG. 1 could each include alternate and/or additional steps, while still remaining within the scope and spirit of example embodiments herein.

Figure 2:
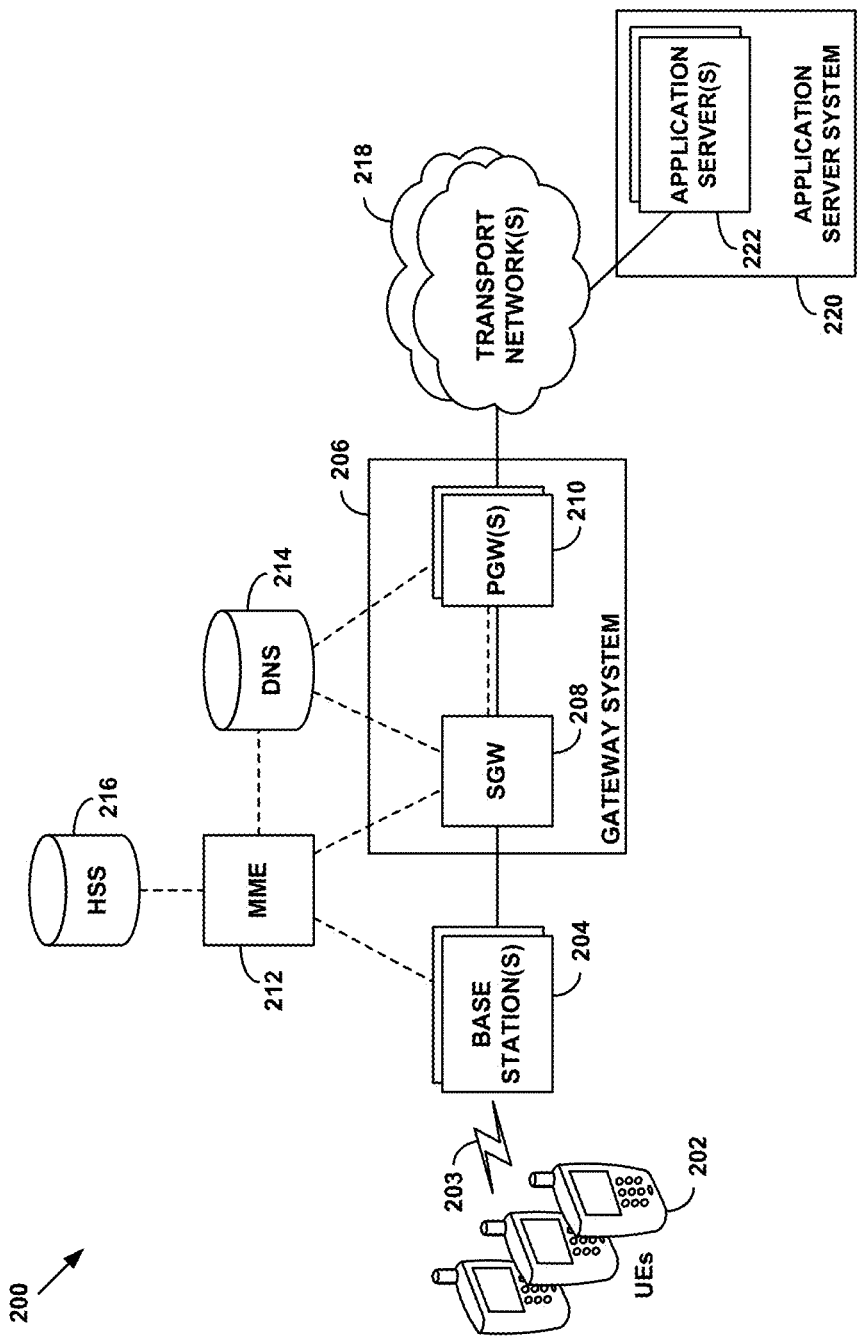
FIG. 2 illustrates an example of wireless communication system in which could be implemented, in accordance with example embodiments.

FIG. 2 shows a simplified block diagram of an example wireless network 200 that can be operated by a wireless service provider, and in which an example method dynamic swapping of uplink and downlink base stations could be carried out. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

The arrangement of FIG. 2 includes by way of example one or more base stations (e.g., enhanced NodeBs or eNodeBs) 204 and one or more UEs 202 within coverage of the base station(s) 204. The base station(s) and UEs may be configured to communicate with each other over a radio frequency air interface 203 according to any of a variety of air interface protocols, examples of which include Orthogonal Frequency Division Multiple Access (OFDMA) (e.g., Long Term Evolution (LTE) or Wireless Interoperability for Microwave Access (WiMAX)), Code Division Multiple Access (CDMA), Global System for Mobile Communications (GSM), and others now known or later developed.

As further illustrated, the arrangement includes a gateway system 206 comprising a representative serving gateway (SGW) 208 and one or more packet gateways (PGWs) 210. The SGW 208 is configured to communicate with the base stations 204 and with the various PGWs 210. And the PGWs 210 are then arranged to provide connectivity with one or more transport networks 218 such as the public Internet and various private application service networks for instance. Shown sitting on the transport network(s) is then an application server system 220 comprising one or more application servers 222, which may support various application services for the UEs. By way of example, a representative application server 222 may be an IMS server configured to provide VoIP services.

In addition, the arrangement includes a representative MME 212, which functions as a controller and may be configured to carry out various functions described herein. The MME 212 is configured to communicate with the base station(s) 204 and with the SGW 208. Further, the MME 212 is configured to communicate with a Home Subscriber Server (HSS) 216, which may store account and service profiles for various UEs 202, and with a DNS server 214, which may store correlation data as described above. As shown, the SGW 208 and PGWs 210 may also be configured to communicate with the DNS server 214.

In practice, many of these components may be owned and/or operated by or for a telecommunications service provider such as a cellular wireless carrier and may physically sit as nodes on a core packet network operated by the service provider. Communications over the various illustrated interfaces may thus pass between various network entities as packet-based communications, such as IP communications for instance, through the core network. As such, dashed lines may represent logical signaling links for carrying signaling messages such as attach requests and responses and bearer setup messages, and solid lines may represent logical bearer links for carrying bearer data such as web browsing data and VoIP signaling and traffic for instance.

With the example arrangement shown, as each UE 202 enters into coverage of a base station 204, the UE may transmit an attach request over the air interface 203 to the base station, and the base station may forward the attach request to MME 212. The MME 212 may then authenticate and authorize the UE 202 and obtain from HSS 216 an indication of one or more application services to which the UE 202 subscribes and may store an indication of those services in a context record for the UE, keyed to a UE identifier such as an International Mobile Subscriber Identity (IMSI) for instance. In turn, the MME 212 may then engage in a process to set up one or more bearer connections for the UE 202, such as one bearer connection for each service to which the UE subscribes. By way of example, if the UE 202 subscribes to engage in general Internet communications and VoIP service, the MME 212 may work to set up a default bearer (e.g., non-guaranteed-bit-rate bearer) for use to carry general Internet traffic for the UE 202, and the MME 212 may further work to set up a dedicated bearer (e.g., guaranteed-bit-rate bearer) for use to carry VoIP signaling (e.g., SIP signaling) and traffic for the UE 202.

To set up each such bearer for a UE 202, the MME 212 may create a bearer identity (e.g., evolved packet system (EPS) bearer identity) and may query the DNS server 214 to determine which PGW 210 should serve the service at issue (e.g., default Internet service or VoIP service). The MME 212 may then send to the SGW 208 a create-session request message specifying the bearer identity and the selected PGW 210. In response, the SGW 208 may then create an entry for the UE 202 in a bearer table that the SGW 208 maintains, designating the bearer identity and an address or other identifier of the serving base station, and may further send to the specified PGW 210 a create-session request. The PGW 210 may then assign an IP address for the UE 202 and create an entry in a bearer table that the PGW 210 maintains. The PGW 210 may then send a create-session response to SGW 208, and the SGW 208 may send a create-session response to the MME 212. And the MME 212 may responsively send to the base station an initial context setup request with an attach-accept message, providing the bearer identity (and perhaps an address or identity of the SGW 212), in response to which the base station may then allocate a radio bearer for UE 202 communication of bearer data over the air interface 203.

Through this process, each such bearer connection is thus defined as a connection extending between the base station 204 and the gateway system 18 and particularly extending between the base station 204 and the SGW 208 and between the SGW 200 and the selected PGW 210. In particular, the base station, SGW 208, and PGW 210 may each store context data specifying the assigned bearer identity and applicable addresses or identities of other entities with which to communicate data for that bearer.

It should be understood that the depiction of just one or a few of each network element and air interface in FIG. 2 is illustrative, and there could be more of any of them, as well as other types of elements not shown. The particular arrangements shown in FIG. 2 should not be viewed as limiting with respect to the example embodiments presented herein. Further, the network components that make up a wireless communication system such as network 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs (or other forms of computer logic instructions) and related data (e.g., machine-language instructions and program and user data) stored in the one or more forms of computer-readable storage and executable by the one or more computer processors to carry out the functions, steps, and procedures of the various example embodiments described herein. Similarly, a communication device such as example UEs 202, typically comprises a user-interface, I/O components, a communication interface, a tone detector, a processing unit, and data storage, all of which may be coupled together by a system bus or other mechanism. As such, network 300, UEs 202, and air interface 203 collectively are representative of example means of implementing and carrying out the various functions, steps, and procedures described herein.

1. Example Access Technologies

An example air interface technology under LTE Advanced is summarized briefly below. As noted above, however, example embodiments discussed herein and illustrated by way of example in the context of LTE Advanced, could be adapted for operation with other air interface technologies as well. Thus, conventional CDMA communication and high rate packet-data time division multiplexing (TDM) communications are briefly summarized as well. In CDMA and high rate packet-data TDM systems, base stations typically include one or more BTSs (antenna transceivers elements) that each radiate a cell or multiple sectors. Multiple BTSs may be under the control of a BSC, and a RAN may include multiple BSCs, possibly as well as one or more MSCs. In the context of CDMA, the UE is generally referred to as an "access terminal" or "AT," the downlink from a BSC is referred to as a "forward link," and the uplink to a BSC is referred to a "reverse link."

a. LTE Advanced Communications

Under LTE Advanced, the downlink comprises multiple frequency carrier bands arranged to cover a total bandwidth of up to 20 MHz (currently) in frequency space. Each frequency carrier band is divided into 12 orthogonal subcarrier frequencies, each 15 kHz in width, for a total of 180 kHz per frequency carrier band. The number of frequency carrier bands corresponds to the integer division of the total bandwidth by 180 kHz. For example, a total bandwidth of 1.25 MHz supports six frequency carrier bands; a total bandwidth of 20 MHz supports 100 frequency carrier bands. The orthogonality of the subcarrier frequencies follows from each being an integer multiple of the same minimum frequency; e.g., 15 kHz. It will be appreciated that a different minimum frequency could be used, as long as the orthogonality condition is met. Similarly, a different number of subcarrier frequencies per frequency carrier band could be used, which could then lead to a different number frequency carrier bands for a given total bandwidth.

In the time domain, the downlink comprises time slots, each typically of 0.5 milliseconds (ms) duration. Every two time slots makes up one "sub-frame" of 1.0 ms duration, and every 10 sub-frames makes up a 10 ms frame. Each time slot is subdivided into an integer number of symbol durations, such that the integer number multiplied by the symbol duration equals 0.5 ms. According to current standards, the integer number is either 6 or 7; the value used depends on operating conditions, among other possible factors. For the purposes of the present discussion the integer number of symbol durations per time slot will be taken to be 7, with the understanding that other values could be used.

Transmissions on the downlink are scheduled in time-frequency units referred to as "physical resource blocks" or PRBs, also sometimes referred to as just "resource blocks" or RBs. Each RB is made up of 7 contiguous symbol durations (i.e., one time slot) and 12 subcarrier frequencies of a given frequency carrier band. Thus, an RB can be viewed a grid of 7 symbol durations by 12 subcarrier frequencies. Each element of the grid is referred to as "resource element," and each resource element carries one OFDM symbol. Each OFDM symbol of a resource element is a time domain symbol generated from Fourier superposition frequency domain symbols.

A single RB is the smallest unit of allocation made for a given UE for downlink transmissions. Allocations are typically made by an eNodeB serving the UE, and more than one RB can be allocated for the UE. Multiple RB allocations for a given UE can be made across multiple frequency carrier bands, across multiple time slots, or both, depending on factors including the amount of data to be transmitted to the UE, the type of data (e.g., best-effort, real-time, etc.), and downlink resources needed for other UEs.

In addition to carrying OFDM symbols specific to a given UE, particular resource elements of a given RB are allocated as "reference signals," and may be used to carry pilot signals from the eNodeB. Upon detection of a pilot signal in one or more resource elements of an RB, a UE may determine a signal-to-noise (SNR) measurement of the eNodeB (or more generally, the LTE Advanced base station) that made the RB-based transmission. More particularly, the UE may monitor a signal-to-noise metric referred to as "signal to interference plus noise ratio" ("SINR"), which includes the degrading effects of interference as well as noise on RF conditions. The UE may then use the SINR (or other SNR measure) of different eNodeBs that it detects to determine if and when to hand off from one to another, for example.

b. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors a pilot signal from each of its active sectors as well as from other sectors, which may vary as the AT moves about within the wireless communication system, or as other factors cause the AT's RF conditions to change. More particularly, the AT monitors a signal-to-noise metric, such as SINR, which includes the degrading effects of interference as well as noise on RF conditions. The AT reports the received signal strengths to the serving base station, which then directs the AT to update its active set in accordance with the reported strengths and one or more threshold conditions.

c. High Rate Packet-Data TDM Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using TDM, in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps. The reverse link under IS-856 retains largely the traditional IS-2000 code division multiplexing (CDM) format, albeit with the addition of a "data rate control" (DRC) channel used by the AT to indicate the supportable data rate and best serving sector for the forward link. More specifically, the DRC channel is a sub-channel of a reverse-link Medium Access Control (MAC) channel.

TDM access on the IS-856 forward link is achieved by dividing the forward link in the time domain into time slots of length 2048 chips each. At a chip rate of 1.228 Mega-chips per second, each slot has a duration of 1.67 ms. Each time slot is further divided into two 1024-chip half-slots, each half-slot arranged to carry a 96-chip pilot "burst" (pilot channel) at its center and a forward-link MAC channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset. Again, a sector could correspond to a femtocell.

2. Dynamic Swapping of Uplink and Downlink Base Stations

In a wireless communication system configured for operation according to LTE, a UE may initiate a communication session by setting up a connection with an eNodeB (or other RAN access element), and attaching to the network via the connection with the eNodeB to establish a network presence. Once a UE attaches to the network and a communication session is established, the UE may exchange data and communications with, and via, the network in accordance with services authorized for the UE. For example, the UE may access internet services, and network-based servers (e.g., content servers) may deliver services (e.g., browsing, media streaming, etc.) to the UE, as well as other data communication services.

Figure 3:
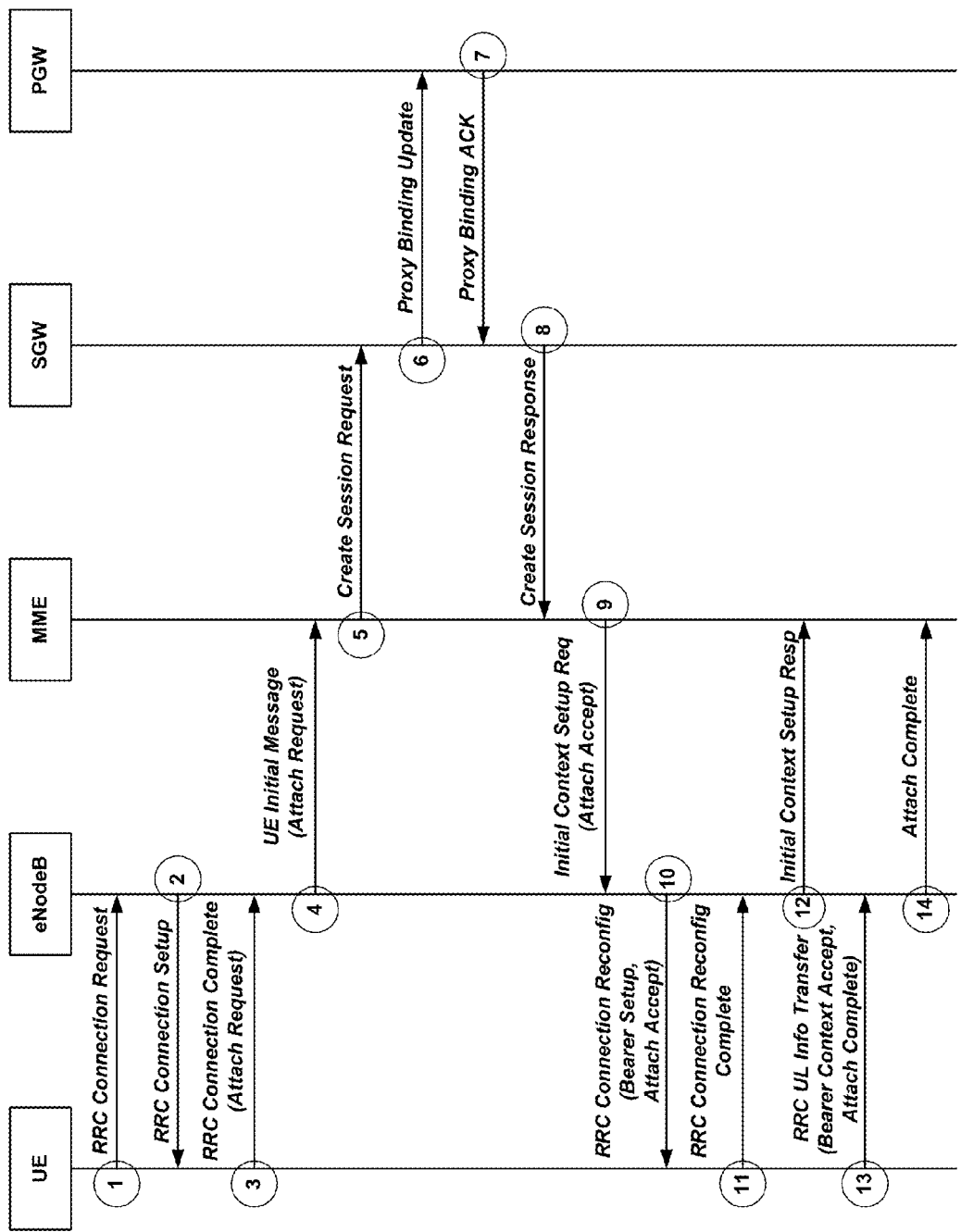
FIG. 3 illustrates an example call flow of a UE establishing a connection and attaching to wireless communication system, in accordance with example embodiments.

An example call flow for connecting and attaching to a network is presented in abbreviated form in FIG. 3. For reference in the discussion, the messages of the call flow are numbered. As shown, a UE sends a Radio Resource Control (RRC) connection request to an eNodeB in message 1. The eNodeB responds with a RRC Connection Setup in message 2. The UE then sends an RRC Connection Setup Complete message with an Attach Request to the eNodeB in message 3, and the eNodeB responds by sending an Initial UE Message with the Attach Request to the MME in message 4.

Next, the MME responds by sending a Create Session Request to the SGW in message 5. The SGW interacts with the PGW, sending a Proxy Binding Update in message 6, and receiving back from the PGW a Proxy Binding ACK in message 7. The SGW then responds to message 5 from the MME by sending back a Create Session Response in message 8. The MME now responds to message 4 by sending the eNodeB an Initial Context Setup Request with an Attach Accept in message 9.

The eNodeB now responds to message 3 by sending the UE a RRC Connection Reconfiguration including Bearer Setup information and the Attach Accept in message 10. Note that the Bearer Setup information may typically include identification of the UE's downlink and uplink eNodeB, which in a usual case will be the eNodeB acting in the call flow.

The UE then acts to complete setup, responding to message 10 by sending to the eNodeB a RRC Reconfiguration Complete in message 11. The eNodeB then responds to message 9 by sending to the MME an Initial Context Setup Response in message 12.

Finally, the UE sends the eNodeB a RRC UL (uplink) Information Transfer, including Bearer Context Accept and Attach Complete, in message 13. The eNodeB now sends the MME an Attach Complete in message 14. At this point, the UE may engage in authorized/permitted/subscribed data communication services with the network. As noted, these can include internet browsing and media services, email, and the like.

There can be additional messages exchanges and transactions not necessarily shown explicitly in the abbreviated call flow of FIG. 3. For example, in between the RRC Connection Complete message 3 from the UE to the eNodeB and the RRC Connection Reconfiguration message 10 from the eNodeB to the UE, there may be message exchanges and transactions for UE identity authentication, service authorization, and conveyance of uplink and downlink information.

In accordance with example embodiments, the Bearer Setup information in the RRC Connection Reconfiguration in message 10 may specify a different eNodeB for the uplink and downlink air interfaces. For example, two different but neighboring eNodeBs may support downlink transmissions using different carrier frequencies, which in turn support different bandwidths. Because data transmission rates can depend on signal-to-noise ratio (e.g., SINR) as well as bandwidth, and SNR (or SINR) can depend in part on the distance between the UE and the eNodeB, it is possible for a UE to receive a higher downlink data rate from a more distant, but larger bandwidth, eNodeB than from closer, but smaller bandwidth, eNodeB. In such an instance, a UE may be assigned a downlink from the more distant eNodeB and an uplink to the closer eNodeB. This is just one illustrative example scenario in which a UE may come to have different eNodeBs for its downlink and uplink air interfaces. Other circumstances involving SINR, distances, and bandwidths could arise that similarly result in a UE acquiring different uplink and downlink eNodeBs.

Figure 4:
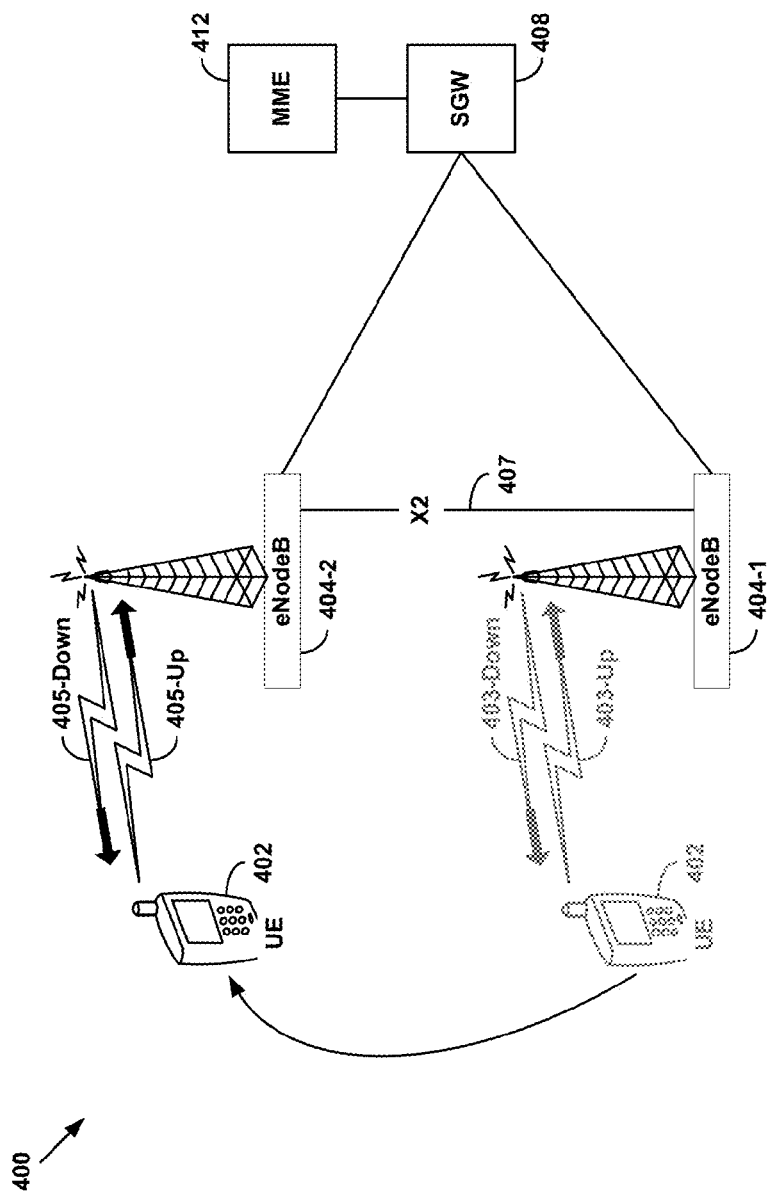
FIG. 4 illustrates uplinks and downlinks between a UE and base stations of a wireless communication system, in accordance with example embodiments.

While engaging in an active communication session under LTE Advanced, a UE may handover from a source eNodeB to a target eNodeB in response to changing RF conditions—or other operational circumstances—that result in favoring the target eNodeB over the source eNodeB. FIG. 4 illustrates handover of a UE 402 in an example RAN 400. As shown, the RAN 400 includes an eNodeB 404-1 that is communicatively connected with a SGW 408, which in turn is communicatively connected with a MME 412. The eNodeB 404-1 is also connected with a second eNodeB 404-2 by way of an "X2" interface connection 407. Under LTE, the X2 interface supports direct communications between peer eNodeBs, without requiring an intervening or mediating device. The eNodeB 404-2 is also communicatively connected with the SGW 408. The RAN 400 may be viewed as a simplified representation of an access network of a wireless communication system, such as that illustrated in FIG. 2.

In example operation of a conventional handover, as illustrated in FIG. 4, the UE 402 is depicted as initially having a downlink 403-Down from an eNodeB 404-1 and an uplink 403-Up to the eNodeB 404-1. As a visual cue, the initial downlink and uplink, as well as the UE 402 in its initial connection with the eNodeB 404-1, are all drawn in gray. The example handover to the target eNodeB 404-2 results in the UE 402 acquiring both a new uplink 405-Up and downlink 405-Down with the target eNodeB, and releasing the initial uplink 403-Up and initial downlink 403-Down. The curved arrow in FIG. 4 represents the handover of the UE 402 from source eNodeB to the target eNodeB.

As described above in connection with FIG. 3, a UE may have a downlink from one eNodeB and an uplink to a different, neighboring eNodeB. The term "neighboring" is used here to describe eNodeBs that provide neighboring or overlapping regions of coverage (e.g., sectors), such that a UE could experience continuous (or nearly continuous) coverage while handing over from one to the other. The operational conditions used to trigger handover may be a subset of relative operational conditions and circumstances of two neighboring eNodeBs that each provides (or can provide) one or the other of both an uplink and downlink to a UE. More particularly, during a communication session in which a UE has a downlink from one eNodeB and an uplink to a different, neighboring eNodeB, relative operational conditions or circumstances may change or evolve such that it would be advantageous to swap the downlink and uplink between the two eNodeBs. Example embodiments described herein provide methods and systems for such dynamic swapping of uplink and downlink eNodeBs (and more generally, base stations), including determination that conditions for swapping have been met, actions to carry out the swapping.

Figure 5:
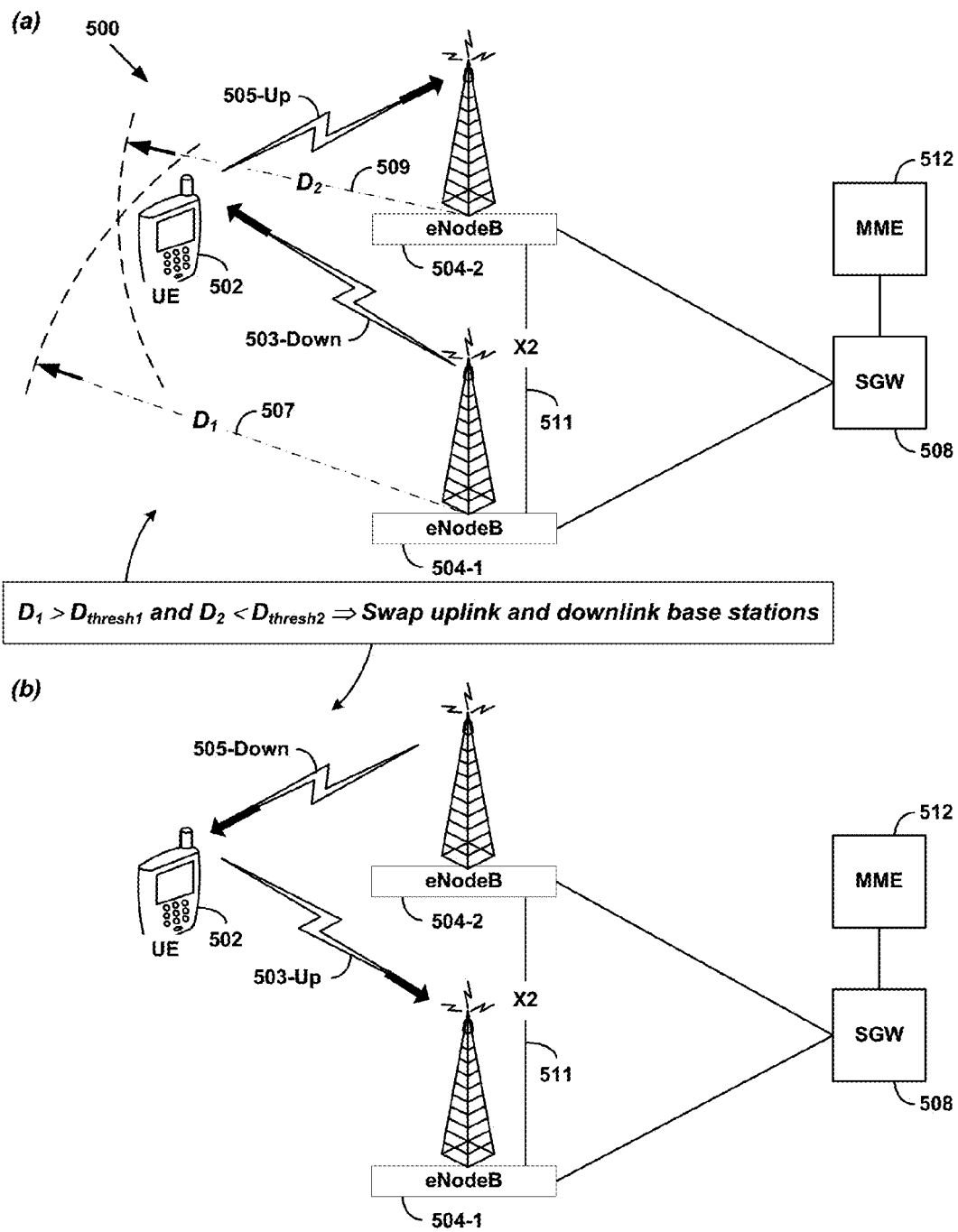
FIG. 5 illustrates operation of dynamic swapping uplink and downlink base stations, in accordance with example embodiments.

FIG. 5 is an illustrative example of dynamic swapping of uplink and downlink base stations, in accordance with example embodiments. In keeping with example embodiments in the context of LTE Advanced, the base stations are taken to correspond to eNodeBs. Specifically, FIG. 5 shows RAN 500 that includes a first eNodeB 504-1 with an X2 interface connection with a second eNodeB 504-2. Both eNodeBs are communicatively connected with a SGW 508, which is then connected with a MME 512. The figure is divided into a top panel, labeled "(a)," corresponding descriptively to a "before-swapping" phase, and a bottom panel, labeled "(b)," corresponding descriptively to an "after-swapping" phase. The RAN elements and configuration are the same in both panels.

In the top panel (a) of FIG. 5, a UE 502 is shown as having, by way of example, a downlink air interface 503-Down from the eNodeB 504-1, and an uplink air interface 505-Up to the eNodeB 504-2. With this arrangement, the UE 502 may be considered as having an active communication session in which it receives data transmissions from the eNodeB 504-1 on the downlink air interface 503-Down, and transmits data to the eNodeB 504-2 on the uplink air interface 505-Up. Among the relative operational conditions that could be used to determine if and when swapping should be carried out is a comparison of the distance of the UE from each of the two eNodeBs. Accordingly, the top panel (a) of FIG. 5 also includes a distance $D_1$ 507 between the UE 502 and the eNodeB 504-1, and a distance $D_2$ 509 between the UE 502 and the eNodeB 504-1. Each distance is indicated by a respective radial line from the respective eNodeB to a respective arc.

In accordance with example embodiments, a condition for swapping could be a determination that $D_1$ is greater than a first threshold distance $D_{thresh1}$, and at the same time, $D_2$ is less than a second threshold distance $D_{thresh2}$. This condition and the resultant determination that swapping should be carried out is indicated in a rectangular text box between the top and bottom panels in FIG. 5. In response to the determination of this distance-comparison condition, the downlinks and uplinks may be swapped.

The bottom panel (b) of FIG. 5 illustrates this swapping. Specifically, as a result of the swapping, the UE 502 is shown as acquiring a downlink air interface 505-Down from the eNodeB 504-2, and an uplink air interface 503-Up to the eNodeB 504-1. With this arrangement, the UE 502 may be considered continuing its active communication session in which it now receives data transmissions from the eNodeB 504-2 on the downlink air interface 505-Down, and transmits data to the eNodeB 504-1 on the uplink air interface 503-Up.

In accordance with example embodiments, swapping of the uplink and downlink air interfaces could be carried out according to a procedure similar to that used for handover, for example. More particularly, messages used to cause a UE to acquire a downlink and uplink with a target eNodeB, and to release those that the UE had with a source eNodeB, could also be used to cause swapping. In the example illustrated in FIG. 5, swapping could thus be achieved as a handover of the downlink 503-Down from the eNodeB 504-1 to the downlink 505-Down from the eNodeB 504-2, and a concurrent handover of the uplink 505-Up to the eNodeB 504-2 to the uplink 503-Up to the eNodeB 504-1. The concurrent handovers could be carried out as separate, but concurrent, handovers, or alternatively as a single handover having different source and target eNodeBs for the uplinks and downlinks. Other procedures could be used and/or devised as well. To the extent that swapping employs handover procedures, it may be carried out via communications over the X2 interface between the eNodeBs, and between each eNodeB and the UE.

In further accordance with example embodiments, the determinations that conditions for swapping have occurred or been met may be carried out by one or more RAN elements acting cooperatively, or with one of them acting in a controlling or directing capacity. For example, each of eNodeB 504-1 and 504-1 could monitor the respective distance $D_1$ and $D_2$ to the UE, and exchange distance information over the X2 interface. Then when one or both eNodeBs recognizes that a distance threshold condition for swapping has occurred, they could invoke a handover procedure to swap between them uplinks from the UE and downlinks to the UE. Alternatively, one of the eNodeBs could be designated to monitor distances and invoke swapping upon determining that the distance comparison condition has been met. As a further alternative, the MME 512 could monitor the distances as reported by the eNodeBs, and act to invoke swapping as a controlling entity upon determining that the distance comparison condition has been met. Other arrangements could be used as well.

In accordance with example embodiments, determination of the respective distances from each of the eNodeBs to the UE could be made in a variety of ways. For example, the distance between an eNodeB and a UE could be determined using round-trip timing messages, where the eNodeB measures round-trip propagation delay of messages sent to and returned from the UE. Multiplying delay by propagation speed (i.e., speed of light) gives distance. This type of distance measurement could also be determined by the UE and reported back to the eNodeB. Distances could also be determined using a Global Positioning Satellite (GPS) system, in which case the UE could report its GPS-determined position to the eNodeB with precision sufficient for the eNodeB to compute the distance by comparing the UE's position to its own. Other techniques for determining distance could be used as well, possibly including those already known and in use in LTE systems.

As discussed above in connection with FIG. 1, the threshold distances need not impose a condition that the UE 502 be closer to the eNodeB 504-2 than to the eNodeB 504-1 in order to call for swapping the downlink and uplink. For example, referring again to FIG. 5, a distance-based swapping condition could employ $D_{thresh1} < D_{thresh2}$. In this case, swapping could be triggered even when the UE 502 is closer to the eNodeB 504-1 than to the eNodeB 504-2. Numerical examples of such an arrangement have been described above in connection with FIG. 1. Also as discussed in connection with FIG. 1, a distance-threshold condition could also be based on a comparison of the ratio of the distances $D_1$ to $D_2$ to a distance threshold (or a comparison of the ratio of the distances $D_2$ to $D_1$ to the inverse of the distance threshold).

In further accordance with example embodiments, triggering dynamic swapping of uplink and downlink base stations could be based on additional and/or alternative operational conditions or circumstances, besides the distance-based thresholds described above. More particularly, comparative bandwidth of two eNodeBs for downlink transmissions to a UE could be used. Referring again to FIG. 5, eNodeBs 504-1 and 504-2 could each monitor available physical resource blocks (PRBs) available on each of one or more carrier bands. This information could be exchanged between the eNodeBs via their common X-2 interface. A condition for swapping could then be a determination that more downlink bandwidth is available from eNodeB 504-2 than from eNodeB 504-1.

Two available bandwidth thresholds could be used in a manner similar to the distance thresholds, such that if the available downlink bandwidth from eNodeB 504-1 is less than a first bandwidth threshold, and a the same time the available downlink bandwidth from eNodeB 504-2 exceeds a second bandwidth threshold, then swapping is invoked (where the result of swapping corresponds to panel (b) in FIG. 5). Alternatively, an available bandwidth ratio could be used, such that if a ratio of the available downlink bandwidth from eNodeB 504-2 to the available downlink bandwidth from eNodeB 504-1 exceeds the available bandwidth ratio, the swapping could be invoked.

As a further alternative, comparative bandwidth loading could be used instead of comparing available bandwidth at each eNodeB. In this arrangement, the available PRBs per carrier band can be used to determine a utilization fraction, or loading, for each given carrier band. Again by way of information exchange over the X-2 interface, the two eNodeBs could determine that utilization (or load) per bandwidth is lower for the downlink 505-Down than for the downlink 503-Down. This condition could then be used to trigger swapping, such that the UE 502 acquires the less utilized downlink 505-Down. The bandwidth-loading comparison could also be based on one or more threshold in such a manner that swapping to a more highly utilized downlink is possible, so long as the higher utilization is below a bandwidth-loading threshold.

Other operational conditions or circumstances that could be employed to trigger dynamic swapping of uplink and downlink base stations could include sector loading, where sector loading measures the number of UEs served in a sector, or the fraction of the total number that can be served. Referring again to FIG. 5, if eNodeB 504-1 is heavily loaded—i.e., is serving a large number of UEs and/or is utilizing a large fraction of its total access service capacity—and at the same time eNodeB 504-2 is relatively lightly (or less) loaded, then swapping could be invoked. Again, thresholds for capacity loading and/or utilization could be used to quantify the conditions for swapping, and the X-2 interface could be used for exchanging sector loading information.

Still further, other operational conditions or circumstances that could be employed to trigger dynamic swapping of uplink and downlink base stations could include available transmission rates. In addition, some of these operational conditions or circumstances could be used together to form multiple dependencies. For example, distance and available bandwidth could be used in combination to determine available transmission rates.

In further accordance with example embodiments, the rationale for triggering dynamic swapping of uplink and downlink base stations could be to improve downlink service to the UE, to improve overall system performance, or both (when both are not mutually exclusive). As such, the operational conditions or circumstances used for triggering can be fashioned to achieve one or more of the rationales. In this sense, triggering of dynamic swapping of uplink and downlink base stations can be broadly based on a determination that more favorable operating conditions for transmitting session communications to the UE are available on a downlink air interface from a target base station than on the downlink air interface from a source base station. The exact specification of what the "more favorable operating conditions" are can be fashioned according to particular requirements or needs of the wireless communication system in which dynamic swapping is employed.

As with the example of distance-based criteria for triggering swapping, determination that other possible operational conditions or circumstances for triggering have occurred or been met can be made by one or more RAN elements in cooperation, or with one acting in a controlling capacity.

3. Implementation of Example Embodiment

Figure 6:
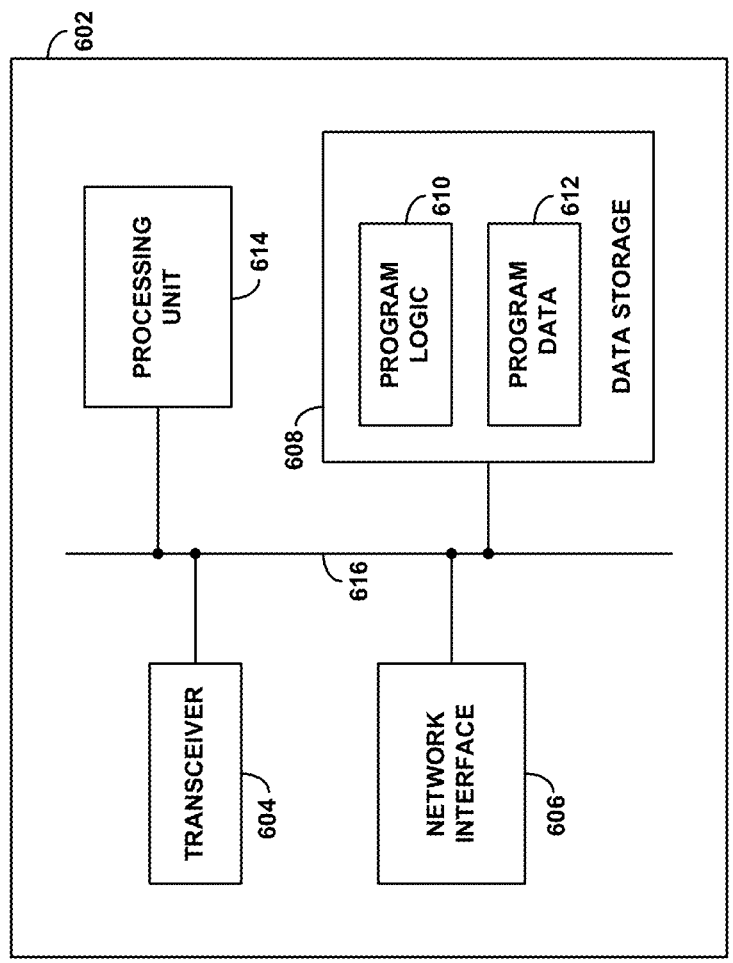
FIG. 6 is a simplified block diagram of an example device of a wireless communication system configured for carrying out dynamic swapping of uplink and downlink base stations, in accordance with example embodiments.

FIG. 6 is a simplified block diagram depicting functional components of an example base station 602 in which an example embodiment of could be carried implemented. As shown in FIG. 6, the example base station 602, representative the eNodeBs 504-1 and 504-2 in FIG. 5, for instance, includes a transceiver 604, network interface 606, a processing unit 614, and data storage 608, all of which may be coupled together by a system bus 616 or other mechanism. In addition, the base station may also include external storage, such as magnetic or optical disk storage, although this is not shown in FIG. 6.

These components may be arranged to support wireless communications in a wireless communication network that is compliant with a variety of wireless air-interface protocols, such as network 200 illustrated in FIG. 2. In particular, these components can support communication sessions with a UE using different base stations for uplink and downlink transmissions, in accordance with example embodiments.

Network interface 606 enables communication on a network, such network 200. As such, network interface 606 may take the form of an Ethernet network interface card or other physical interface to a broadband connection to the internet or some other data network. Further, network interface 606 in combination with transceiver 604, which may include one or more antennas, enables air interface communication with one or more UEs, supporting both downlink and uplink transmissions.

Processing unit 614 comprises one or more general-purpose processors (e.g., INTEL microprocessors) and/or one or more special-purpose processors (e.g., dedicated digital signal processor, application specific integrated circuit, etc.). In turn, the data storage 608 comprises one or more volatile and/or non-volatile storage components, such as magnetic or optical memory or disk storage. Data storage 608 can be integrated in whole or in part with processing unit 614, as cache memory or registers for instance. As further shown, data storage 608 is equipped to hold program logic 610 and program data 612.

Program data 612 may comprise data such as one or another threshold applied in determining when to trigger activation of dynamic swapping of uplink and downlink base stations. Program logic 610 may comprise machine language instructions that define routines executable by processing unit 614 to carry out various functions described herein. In particular the program logic, communication interface, and transceiver may operate cooperatively to carry out logical operation, such as dynamic swapping of uplink and downlink base stations, and other functions discussed above.

It will be appreciated that there can be numerous specific implementations of a base station (e.g. eNodeB), such as base station 602, in which dynamic swapping of uplink and downlink base stations could be implemented. Further, one of skill in the art would understand how to devise and build such an implementation. As such, base station 602 is representative of means for carrying out dynamic swapping of uplink and downlink base stations, in accordance with the methods and steps described herein by way of example.

4. Conclusion

An example embodiment has been described above. Those skilled in the art will understand, however, that changes and modifications may be made to this embodiment without departing from the true scope and spirit, which is defined by the claims.

We claim:

1. In a wireless communication system including a first base station and a different, second base station, a method comprising:

while serving a user equipment device (UE) in a communication session, transmitting session communications to the UE over a downlink air interface from the first base station and receiving session communications from the UE over an uplink air interface to the second base station, wherein the downlink air interface from the first base station is assigned to the UE for downlink session communications to the UE, and the uplink air interface to the second base station is concurrently assigned to the UE for uplink communications from the UE;

making a determination that more favorable operating conditions for transmitting session communications to the UE are available on a downlink air interface from the second base station than on the downlink air interface from the first base station; and in response to making the determination, swapping the downlink air interface from the first base station with the downlink air interface from the second base station, and swapping the uplink air interface to the second base station with an uplink air interface to the first base station for session communications from the UE, wherein as a result of swapping, the downlink air interface from the second base station is assigned to the UE for downlink session communications to the UE, and the uplink air interface to the first base station is concurrently assigned to the UE for uplink communications from the UE, wherein swapping the downlink air interface from the first base station with the downlink air interface from the second base station comprises executing a channel reassignment protocol with the UE to replace a downlink air interface channel from the first base station to the UE with a downlink air interface channel from the second base station to the UE, and thereafter transmitting session communications to the UE over the downlink air interface channel from the second base station, and wherein swapping the uplink air interface to the second base station with an uplink air interface to the first base station comprises executing the channel reassignment protocol with the UE to replace an uplink air interface channel from the UE to second base station with an uplink air interface channel from the UE to first base station, and thereafter receiving session communications from the UE over the uplink air interface channel to the first base station.

2. The method of claim 1, wherein making the determination comprises determining that the UE is located both greater than a first threshold distance from the first base station, and less than a second threshold distance from the second base station.

3. The method of claim 2, wherein determining that the UE is located both greater than the first threshold distance from the first base station, and less than the second threshold distance from the second base station comprises determining that the distance between the UE and the first base station divided by the distance between the UE and the second base station is greater than a threshold ratio.

4. The method of claim 1, wherein making the determination comprises determining that the downlink air interface from the second base station has more transmission capacity than the downlink air interface from the first base station, transmission capacity being measured in at least one of: fractional utilization of total transmission capacity, available transmission bandwidth, transmission rate, or load.

5. The method of claim 1, wherein making the determination comprises determining a performance metric, the performance metric being at least one of: (i) a user quality metric indicative of a level of service provided to the UE, or (ii) a system quality metric indicative of an overall level of service provided by at least the first and second base stations of the wireless communication system to one or more UEs, including the UE.

6. The method of claim 1, wherein making the determination comprises making the determination by at least one of the first base station, the second base station, or an entity of the wireless communication system that controls the first and second base stations.

7. The method of claim 1, wherein the wireless communication system is configured to operate at least according to Long Term Evolution (LTE), wherein the channel reassignment protocol includes specification of procedures for handover, wherein executing the channel reassignment protocol with the UE to replace the downlink air interface channel from the first base station to the UE with the downlink air interface channel from the second base station to the UE comprises executing a handover of the UE from the first base station to the second base station for downlink communications, and wherein executing the channel reassignment protocol with the UE to replace the uplink air interface channel from the UE to second base station with the uplink air interface channel from the UE to first base station comprises executing a handover of the UE from the second base station to the first base station for uplink communications.

8. A device configured for operation in a wireless communication system, wherein the wireless communication system includes a first base station and a different, second base station, the device comprising:

one or more processors;

memory; and machine-readable instructions stored in the memory, that upon execution by the one or more processors cause the device to carry out operations comprising:

while a user equipment device (UE) is engaging in a communication session over a downlink air interface channel from the first base station to the UE and over an uplink air interface channel from the UE to the second base station, making a determination that more favorable operating conditions for transmitting session communications to the UE are available on a downlink air interface channel from the second base station to the UE than on the downlink air interface channel from the first base station to the UE, wherein the downlink air interface from the first base station is assigned to the UE for downlink session communications to the UE, and the uplink air interface to the second base station is concurrently assigned to the UE for uplink communications from the UE, and in response to making the determination, causing swapping of the downlink air interface channel from the first base station with the downlink air interface channel from the second base station, and causing swapping of the uplink air interface channel to the second base station with an uplink air interface channel from the UE to the first base station, wherein as a result of swapping, the downlink air interface from the second base station is assigned to the UE for downlink session communications to the UE, and the uplink air interface to the first base station is concurrently assigned to the UE for uplink communications from the UE, wherein swapping of the downlink air interface channel from the first base station with the downlink air interface channel from the second base station comprises executing a channel reassignment protocol with the UE to replace the downlink air interface channel from the first base station to the UE with the downlink air interface channel from the second base station to the UE, and thereafter transmitting session communications to the UE over the downlink air interface channel from the second base station, and wherein swapping of the uplink air interface to the second base station with the uplink air interface to the first base station comprises executing the channel reassignment protocol with the UE to replace the uplink air interface channel from the UE to second base station with the uplink air interface channel from the UE to first base station, and thereafter receiving session communications from the UE over the uplink air interface channel to the first base station.

9. The device of claim 8, wherein the device is one of the first base station, the second base station, or an entity of the wireless communication system that controls the first and second base stations.

10. The device of claim 8, wherein making the determination comprises determining that the UE is located both greater than a first threshold distance from the first base station, and less than a second threshold distance from the second base station.

11. The device of claim 8, wherein making the determination comprises determining that the downlink air interface channel from the second base station has more transmission capacity than the downlink air interface channel from the first base station, transmission capacity being measured in at least one of: fractional utilization of total transmission capacity, available transmission bandwidth, transmission rate, or load.

12. The first device of claim 8, wherein the wireless communication system is configured to operate at least according to Long Term Evolution (LTE), wherein the channel reassignment protocol includes specification of procedures for handover, wherein executing the channel reassignment protocol with the UE to replace the downlink air interface channel from the first base station to the UE with the downlink air interface channel from the second base station to the UE comprises executing a handover of the UE from the first base station to the second base station for downlink communications, and wherein executing the channel reassignment protocol with the UE to replace the uplink air interface channel from the UE to second base station with the uplink air interface channel from the UE to first base station comprises executing a handover of the UE from the second base station to the first base station for uplink communications.

13. A non-transitory computer-readable medium having instructions stored thereon that, upon execution by one or more processors of a radio access network (RAN) device of a wireless communication network that includes a first base station and a different, second base station, cause the RAN device to carry out functions including:

while a user equipment device (UE) is engaging in a communication session over a downlink air interface channel from the first base station to the UE and over an uplink air interface channel from the UE to the second base station, making a determination that more favorable operating conditions for transmitting session communications to the UE are available on a downlink air interface channel from the second base station to the UE than on the downlink air interface channel from the first base station to the UE, wherein the downlink air interface from the first base station is assigned to the UE for downlink session communications to the UE, and the uplink air interface to the second base station is concurrently assigned to the UE for uplink communications from the UE, and in response to making the determination, causing swapping of the downlink air interface channel from the first base station with the downlink air interface channel from the second base station, and causing swapping of the uplink air interface channel to the second base station with an uplink air interface channel from the UE to the first base station, wherein as a result of swapping, the downlink air interface from the second base station is assigned to the UE for downlink session communications to the UE, and the uplink air interface to the first base station is concurrently assigned to the UE for uplink communications from the UE, wherein swapping of the downlink air interface channel from the first base station with the downlink air interface channel from the second base station comprises executing a channel reassignment protocol with the UE to replace the downlink air interface channel from the first base station to the UE with the downlink air interface channel from the second base station to the UE, and thereafter transmitting session communications to the UE over the downlink air interface channel from the second base station, and wherein swapping of the uplink air interface to the second base station with the uplink air interface to the first base station comprises executing the channel reassignment protocol with the UE to replace the uplink air interface channel from the UE to second base station with the uplink air interface channel from the UE to first base station, and thereafter receiving session communications from the UE over the uplink air interface channel to the first base station.

14. The non-transitory computer-readable medium of claim 13 wherein making the determination comprises determining that the UE is located both greater than a first threshold distance from the first base station, and less than a second threshold distance from the second base station.

15. The non-transitory computer-readable medium of claim 13, wherein making the determination comprises determining that the downlink air interface channel from the second base station has more transmission capacity than the downlink air interface channel from the first base station, transmission capacity being measured in at least one of: fractional utilization of total transmission capacity, available transmission bandwidth, transmission rate, or load.

16. The non-transitory computer-readable medium of claim 13, wherein making the determination comprises determining a performance metric, the performance metric being at least one of: (i) a user quality metric indicative of a level of service provided to the UE, or (ii) a system quality metric indicative of an overall level of service provided by at least the first and second base stations of the wireless communication system to one or more UEs, including the UE.

17. The non-transitory computer-readable medium of claim 13, wherein the wireless communication system is configured to operate at least according to Long Term Evolution (LTE), wherein the channel reassignment protocol includes specification of procedures for handover, wherein executing the channel reassignment protocol with the UE to replace the downlink air interface channel from the first base station to the UE with the downlink air interface channel from the second base station to the UE comprises executing a handover of the UE from the first base station to the second base station for downlink communications, and wherein executing the channel reassignment protocol with the UE to replace the uplink air interface channel from the UE to second base station with the uplink air interface channel from the UE to first base station comprises executing a handover of the UE from the second base station to the first base station for uplink communications.

* * * * *